United States Patent
Shibata et al.

(10) Patent No.: US 9,506,620 B2
(45) Date of Patent: Nov. 29, 2016

(54) VEHICLE LIGHTING DEVICE

(71) Applicant: KOITO MANUFACTURING CO., LTD., Tokyo (JP)

(72) Inventors: Hiroki Shibata, Shizuoka (JP); Kazutami Oishi, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 14/178,498

(22) Filed: Feb. 12, 2014

(65) Prior Publication Data

US 2014/0233252 A1 Aug. 21, 2014

(30) Foreign Application Priority Data

Feb. 15, 2013 (JP) ................................ 2013-027523

(51) Int. Cl.
- F21V 17/02 (2006.01)
- F21S 8/10 (2006.01)
- B60Q 1/068 (2006.01)

(52) U.S. Cl.
CPC .......... *F21S 48/321* (2013.01); *B60Q 1/0683* (2013.01); *F21S 48/1159* (2013.01); *F21S 48/1258* (2013.01); *F21S 48/1721* (2013.01); *F21S 48/1768* (2013.01); *F21S 48/33* (2013.01)

(58) Field of Classification Search
CPC ............. F21S 48/1104; B60Q 1/0683; F21V 29/004; F21V 29/77
USPC ........................................ 362/547, 264, 546
See application file for complete search history.

(56) References Cited

U.S. PATENT DOCUMENTS

| | | | |
|---|---|---|---|
| 5,499,173 A * | 3/1996 | Yamamoto | 362/460 |
| 5,673,992 A * | 10/1997 | Schmitt | B60Q 1/0683 362/267 |
| 5,735,656 A * | 4/1998 | Marvell et al. | 411/366.1 |
| 7,144,145 B2 * | 12/2006 | Watanabe | B60Q 1/06 362/294 |
| 8,585,265 B2 * | 11/2013 | Shibata | B60Q 1/0683 362/264 |
| 8,632,228 B2 * | 1/2014 | Shibata et al. | 362/460 |
| 2002/0006043 A1 * | 1/2002 | Dinant | F21S 48/1104 362/547 |
| 2003/0058656 A1 * | 3/2003 | Yamaguchi | B60Q 1/007 362/547 |
| 2004/0240207 A1 * | 12/2004 | Takezawa | F21V 29/004 362/264 |
| 2006/0104077 A1 * | 5/2006 | Oshio et al. | 362/547 |

FOREIGN PATENT DOCUMENTS

| | | |
|---|---|---|
| CN | 102734727 A | 10/2012 |
| JP | 2012-164428 A | 8/2012 |

OTHER PUBLICATIONS

Office Action dated Aug. 24, 2015, issued by the State Intellectual Property Office of P.R. China in counterpart Chinese Application No. 201410051133.1.

* cited by examiner

*Primary Examiner* — Peggy Neils
*Assistant Examiner* — Tsion Tumebo
(74) *Attorney, Agent, or Firm* — Sughrue Mion, PLLC

(57) ABSTRACT

There is provided a lighting device which is to be mounted on a vehicle. The lighting device includes: a housing forming a lamp chamber, the housing including a wall having an opening therethrough; a light source which is disposed in the lamp chamber; a heat sink, wherein the light source is fixed to the heat sink; a fixation portion, wherein the heat sink is fixed to the housing via the fixation portion. A first portion of the heat sink faces an inner surface of the wall. A second portion of the heat sink is exposed to an outside of the wall through the opening. The fixation portion is provided on the outside of the wall to face the opening.

10 Claims, 18 Drawing Sheets

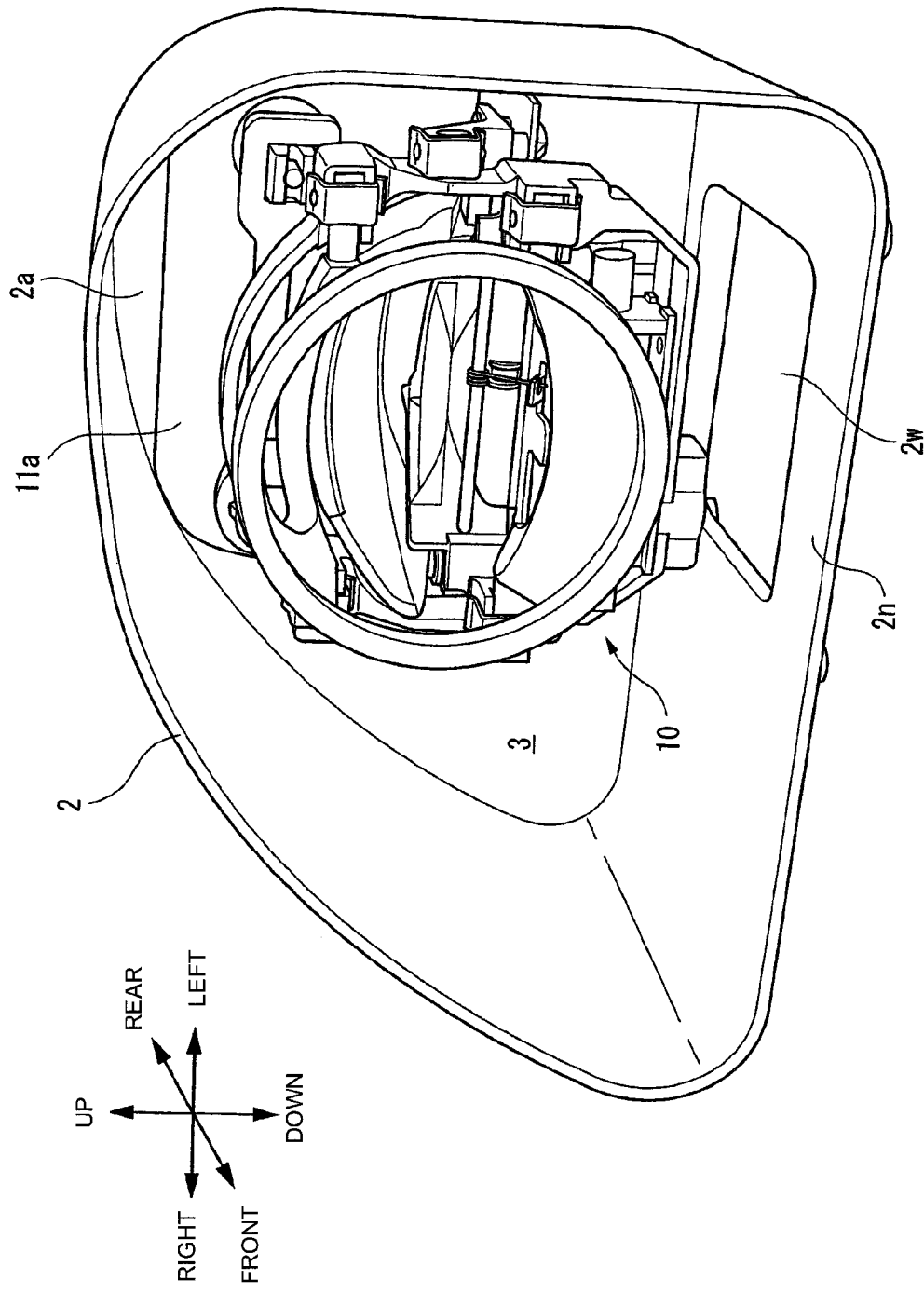

VEHICLE LIGHTING DEVICE

BACKGROUND

1. Technical Field

The present invention relates to a lighting device which is mounted on a vehicle.

2. Related Art

In this kind of lighting device, a lamp unit is disposed in a lamp chamber which is formed by a housing and a translucent member. In the lamp unit, a light source is fixed to a heat sink. The light emitted from the light source is guided in a predetermined direction by an optical system which includes a reflector, a projection lens, or the like and illuminates a predetermined region through the translucent member.

When the lamp unit is disposed in the lamp chamber, a configuration in which the lamp unit is attached from the outside of the housing has been known (for example, see JP-A-2012-164428). An opening is formed through a wall which forms the housing, and the lamp unit is introduced from a side, in which the projection lens is provided, into the housing through the opening. A portion of the heat sink closes the opening from the outside of the housing.

In the case of the configuration in which the lamp unit is attached from the outside of the housing, fixation portions, in which parts fixing the heat sink to the housing are disposed, should be disposed around the opening which is formed in the housing. Accordingly, an increase in the size of the portion of the heat sink closing the opening is unavoidable. Moreover, in order to cover a fixing part which is exposed into the housing, a shape of an extension which is disposed in the lamp chamber is limited.

SUMMARY OF THE INVENTION

One of objects of the present invention is to decrease the size of the heat sink and improve design freedom of the extension.

According to one of aspects of the present invention, there is provided a lighting device which is to be mounted on a vehicle. The lighting device comprises: a housing forming a lamp chamber, the housing comprising a wall having an opening therethrough; a light source which is disposed in the lamp chamber; a heat sink, wherein the light source is fixed to the heat sink; a fixation portion, wherein the heat sink is fixed to the housing via the fixation portion, wherein a first portion of the heat sink faces an inner surface of the wall, wherein a second portion of the heat sink is exposed to an outside of the wall through the opening, and wherein the fixation portion is provided on the outside of the wall to face the opening.

According to this configuration, the heat sink can be attached to the housing from the inner side of the lamp chamber. Since the fixation portion which fixes the heat sink to the housing is provided to face the opening on the outside of the wall, the first portion of the heat sink may have a size which is slightly larger than that of the opening. Accordingly, an increase in a size of the heat sink can be avoided, and parts costs can be decreased.

Moreover, the size of the first portion of the heat sink which is positioned on the outside of the opening can be minimized, and since the fixing parts such as screws are not exposed to the inside of the lamp chamber, it is not necessary to consider the shape of an extension which covers the fixing parts. Accordingly, a degree of freedom for selection of the shape of the extension can be improved.

According to one of aspects of the present invention, the lighting device further comprises: a sealing member which is provided between the first portion of the heat sink and the inner surface of the wall. In this case, water-tightness between the housing and the heat sink can be secured, and it is possible to prevent water or dust from entering into the lamp chamber through an attachment portion.

According to one of aspects of the present invention, a groove for accommodating the sealing member is formed in one of the first portion of the heat sink and the inner surface of the wall, and a protrusion for pressing the sealing member is formed in the other of the first portion of the heat sink and the inner surface of the wall. In this case, the sealing member is securely held between the heat sink and the housing, and it is possible to more securely prevent water or dust from penetrating into the lamp chamber.

According to one of aspects of the present invention, the first portion of the heat sink and the inner surface of the wall contact each other between the opening and the sealing member. In this case, it is possible to securely prevent water or dust from entering into the lamp chamber through the opening.

According to one of aspects of the present invention, the lighting device further comprises: an optical system configured to guide light emitted from the light source in a certain direction; and a screw configured to adjust an optical axis of the optical system, wherein the screw extends to penetrate the second portion of the heat sink. In this case, since the screw extends to penetrate the portion which is exposed to the outside of the wall through the opening in the heat sink, a reference position of an optical axis can be adjusted without increasing the size of the structure.

BRIEF DESCRIPTION OF THE DRAWINGS

FIG. 11 is a perspective view showing the housing of FIG. 1 in which the work window is formed;

DETAILED DESCRIPTION

Hereinafter, embodiments of the present invention will be described in detail with reference to the accompanying drawings. Moreover, in each drawing used in descriptions below, scales are appropriately modified to show each member at a recognizable size.

Figure 1:
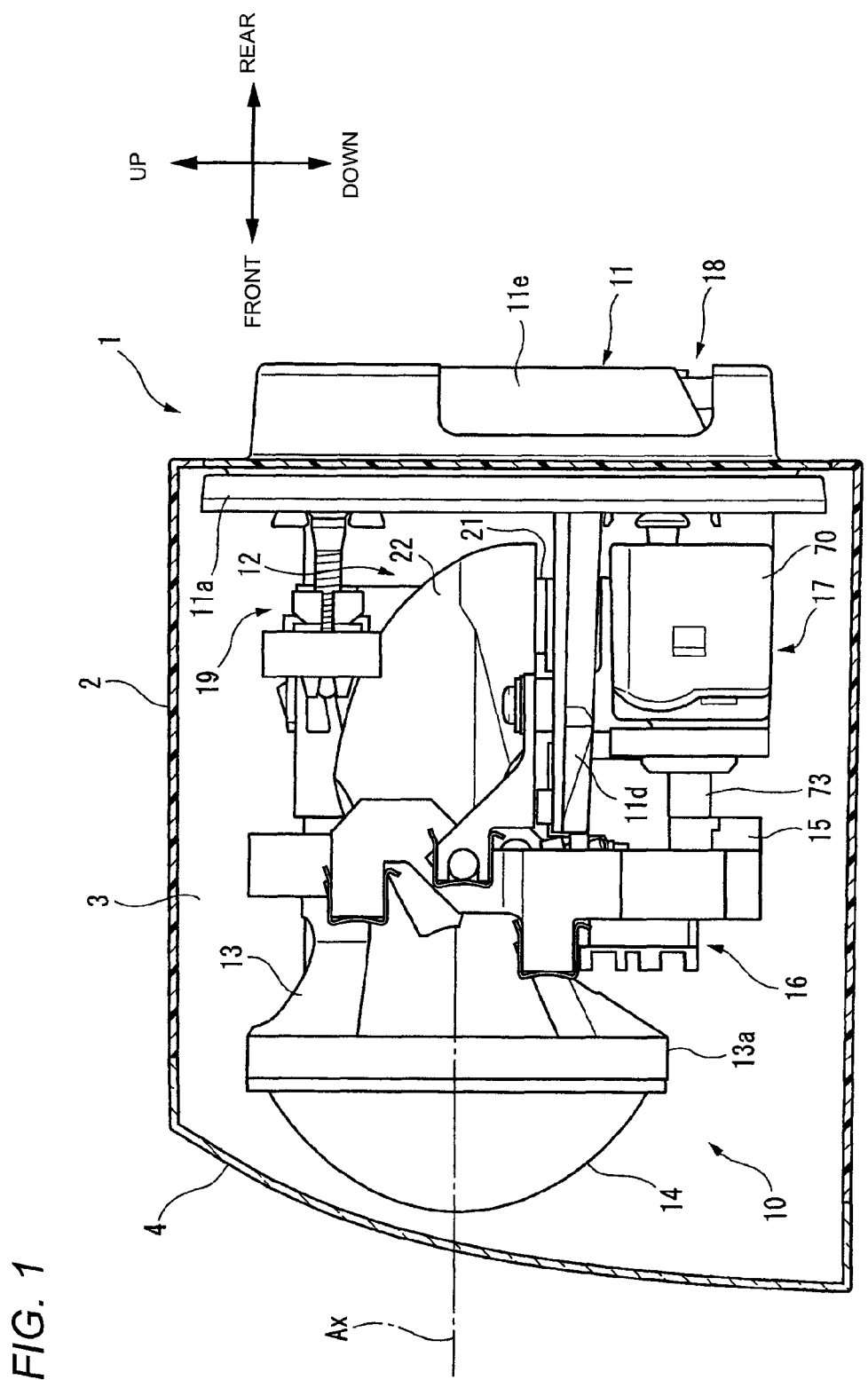
FIG. 1 is a partially cross-sectional left side view showing a lighting device according to a first embodiment of the present invention.

FIG. 1 is a view showing a state where a headlight device 1 (one example of lighting device) according to a first embodiment of the present invention is partially cut along a vertical surface and is viewed from the left side. The headlight device 1 is a device which is mounted on a front portion of a vehicle and is configured to illuminate the front region of the vehicle. The headlight device 1 includes a housing 2 and a translucent cover 4 which is mounted on the housing 2. The housing 2 and the translucent cover 4 form a lamp chamber 3. The translucent cover 4 is mounted to the housing 2 via sealing adhesive. A lamp unit 10 is disposed in the lamp chamber 3.

The lamp unit 10 includes a heat sink 11, a light source unit 12, a lens holder 13, a projection lens 14, a light distribution controller 16, an actuator 17, a first aiming mechanism 18, and a second aiming mechanism 19.

The heat sink 11 includes a rear plate portion 11a which extends in vertical and horizontal directions. A support portion 11d extends forward from the front side of the rear plate portion 11a. A plurality of radiation plates 11e are formed on the rear surface side of the rear plate portion 11a. Each radiation plate 11e extends in the vertical direction.

The light source unit 12 includes a light source 21 and a reflector 22. The light source 21 and the reflector 22 are fixed to the support portion 11d of the heat sink 11. An inner surface 22a (refer to FIG. 2) of the reflector 22 having a dome shape is a reflecting surface and is disposed to face the light source 21.

The projection lens 14 is a plano-convex aspherical lens whose emitting surface is a convex surface and whose incident surface is a plane. Light emitted from the light source 21 is reflected forward by the inner surface 22a of the reflector 22 and at least a portion of the light passes through the projection lens 14. The light passing through the projection lens 14 is projected toward the front side through the translucent cover 4.

The lens holder 13 is disposed on the front side of the reflector 22. The lens holder 13 includes a lens support portion 13a. The lens support portion 13a is an annular frame, and the projection lens 14 is fixed on the front surface of the lens support portion 13a. A joint member 15 is provided in the lower portion of the lens support portion 13a.

The actuator 17 is disposed to face the lower side of the support portion 11d of the heat sink 11 in the rear side of the lens holder 13. The actuator 17 includes a case 70 and a shaft 73. A driving circuit provided in the case 70 receives control signals from a controller (not shown) which is provided on the outside of the lamp unit 10. The shaft 73 advances and retreats with respect to the case 70 in response to the control signals. The actuator 17 is disposed so that a tip of the shaft 73 is directed to the front side. The tip of the shaft 73 is connected to the joint member 15.

Figure 2:
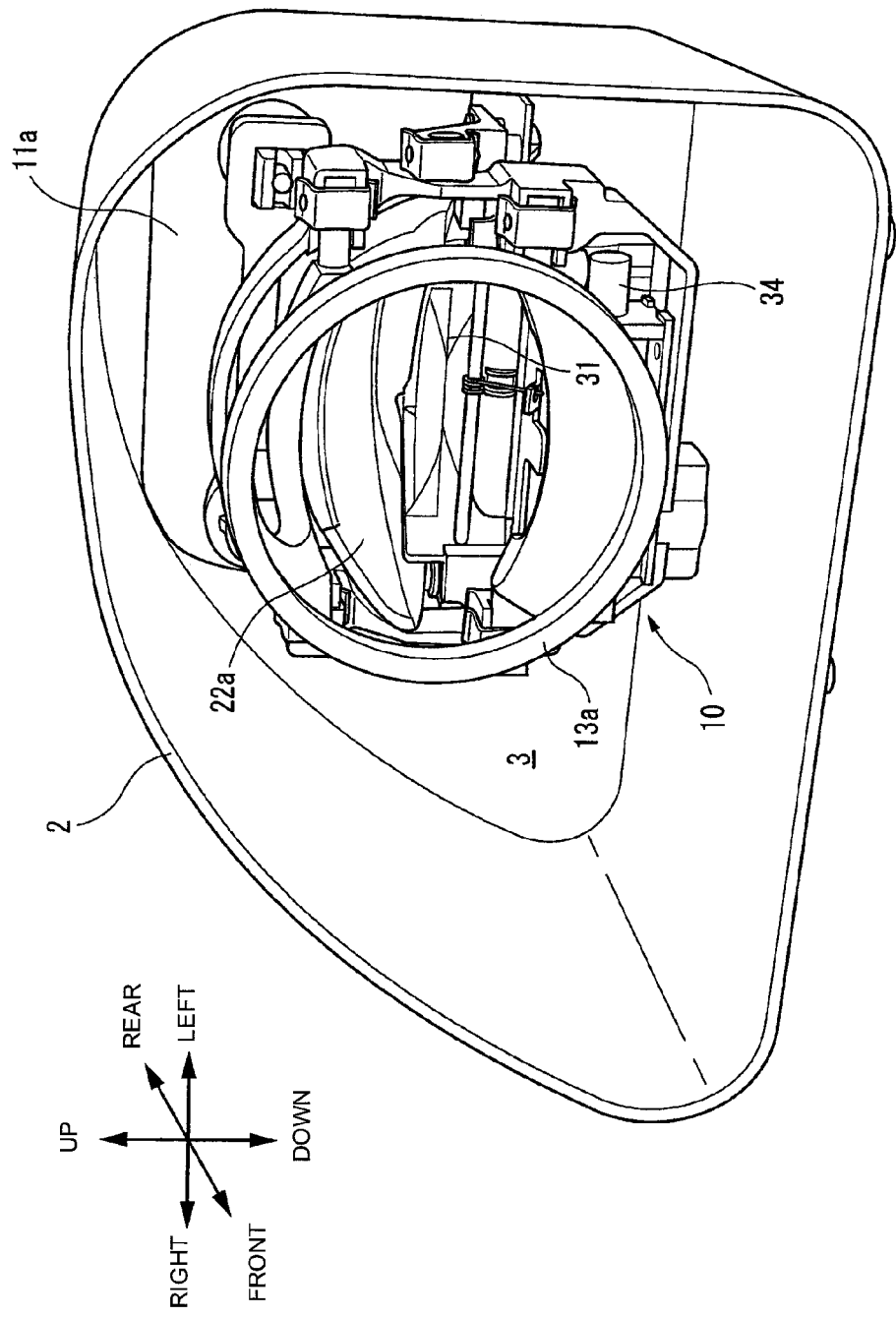
FIG. 2 is a perspective view showing a lamp unit which is disposed in a housing of FIG. 1.

FIG. 2 is a perspective view showing the lamp unit 10 disposed in the housing 2 in which the translucent cover 4 and the projection lens 14 are omitted. The light distribution controller 16 is disposed on the front side of the light source unit 12 and includes a movable shade 31 and a solenoid 34.

The movable shade 31 is disposed slightly forward of a rear focus of the projection lens 14. Accordingly, a portion of the light which is emitted from the light source 21 and reflected by the inner surface 22a of the reflector 22 is blocked by the movable shade 31. The shape of an upper edge of the movable shade 31 is reversed and projected forward, and thus, a low-beam light distribution pattern, which has a cutoff line corresponding to the shape of the upper edge and whose lower side becomes an illumination region, is formed on the front side of the vehicle.

A plunger, which is included in the solenoid 34, is connected to a link mechanism (not shown). The link mechanism is connected the movable shade 31. Power is supplied to a coil included in the solenoid 34 and the plunger is activated, so that the movable shade 31 is tilted toward the rear side via the link mechanism.

Accordingly, the upper edge of the movable shade 31 is retreated below an optical axis Ax of the projection lens 14, and thus, a shading state of the light emitted from the light source 21 is released. The light, which is emitted from the light source 21 and is reflected by the reflector 22, passes through the projection lens 14, and forms a high-beam light distribution pattern, which illuminates a front wide range of the vehicle up to a distant place.

Figure 3:
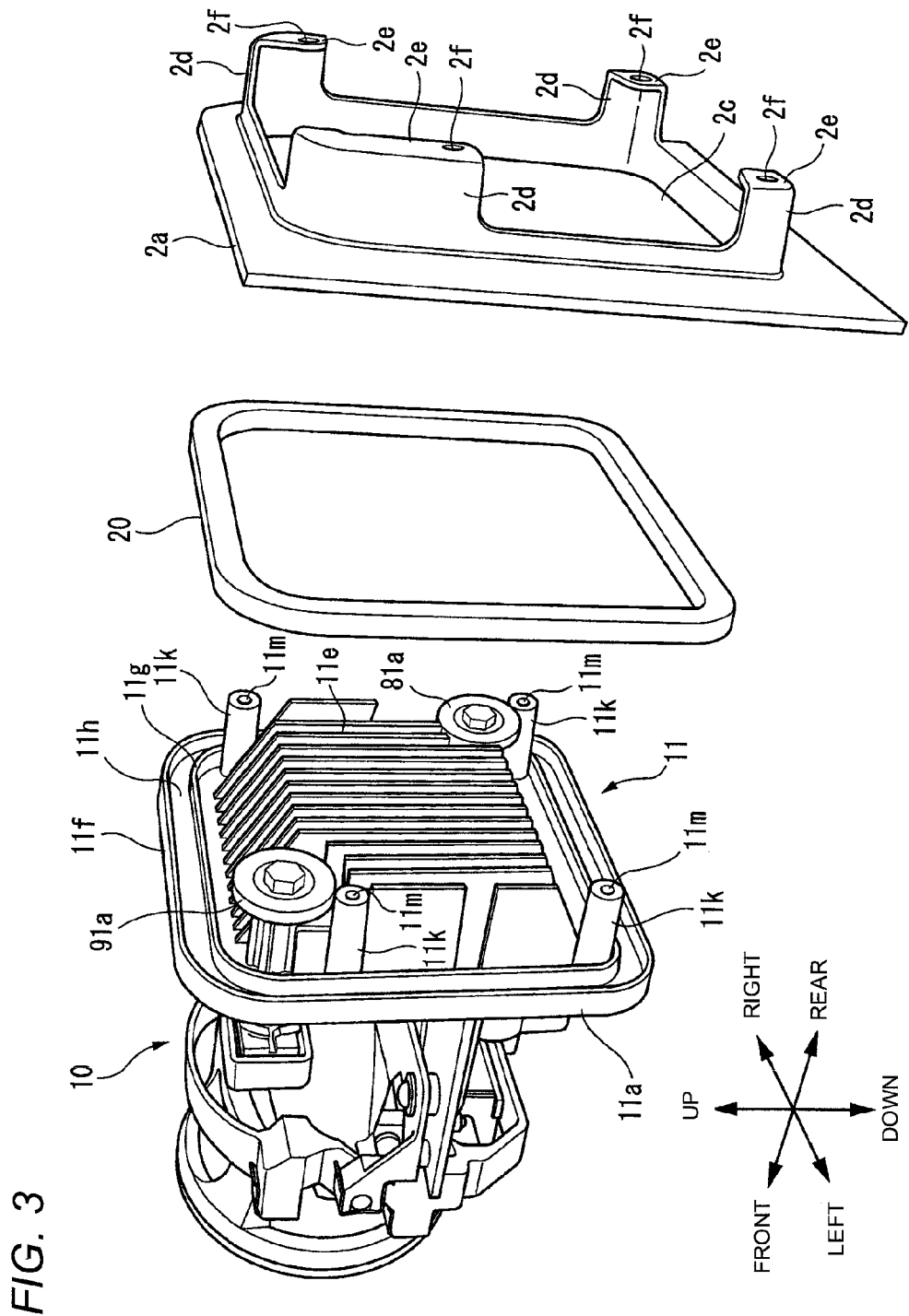
FIG. 3 is an exploded perspective view showing a method of attaching the lamp unit to the housing of FIG. 1.
Figure 4B:
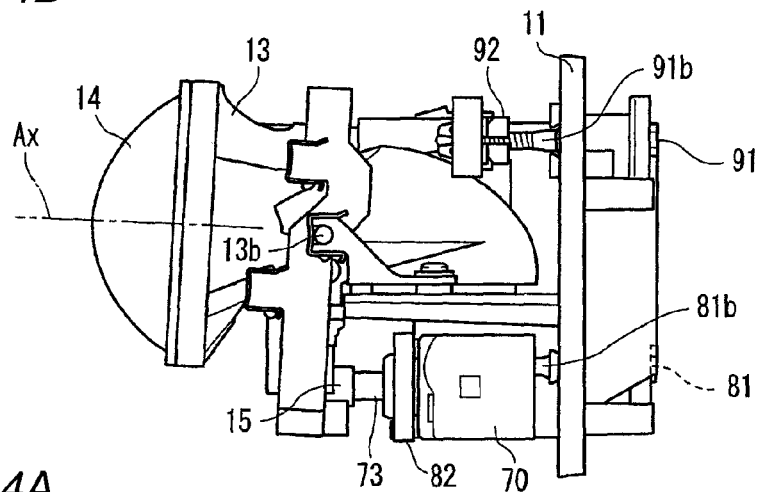
FIGS. 4A to 4C are left side views showing movement of the lamp unit of FIG. 1 in response to operation of a first aiming screw.
Figure 4A:
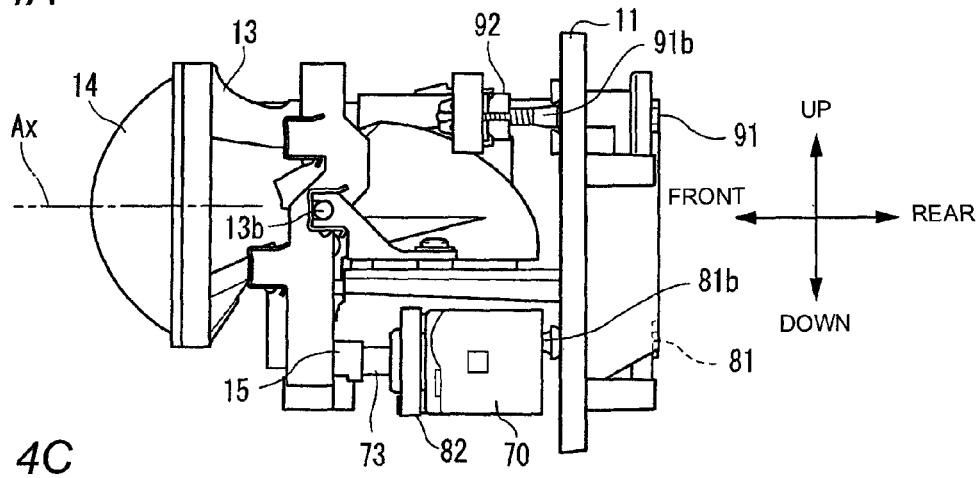
Figure 4C:
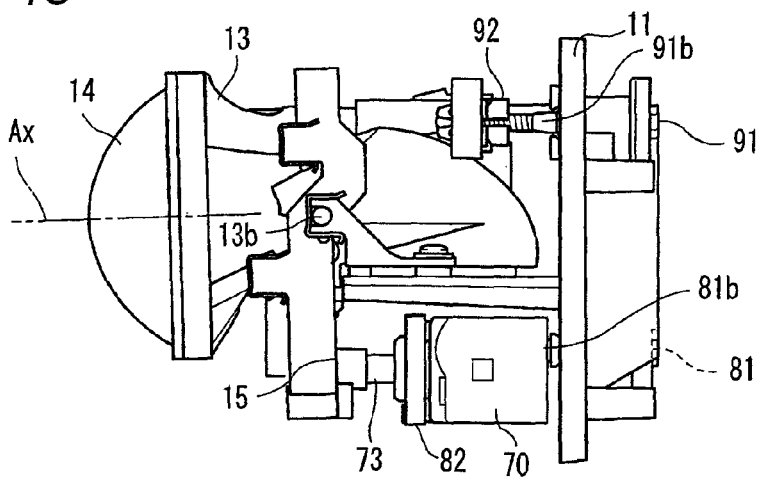

The first aiming mechanism 18 includes a first aiming screw 81 (an example of a screw) and a joint member 82. The first aiming screw 81 includes a head portion 81a and a shaft portion 81b. As shown in FIG. 3, the head portion 81a is disposed on the rear surface side in the lower left portion of the rear plate 11a of the heat sink 11. As shown in FIGS. 4A to 4C, the shaft portion 81b penetrates the rear plate 11a of the heat sink 11 and extends forward. Screw grooves (not shown) are formed on the outer circumferential surface of the shaft portion 81b.

The joint member 82 includes an insertion hole in which screw grooves are formed on the inner circumferential surface (not shown). The shaft portion 81b of the first aiming screw 81 is inserted into the insertion hole formed in the joint member 82. Moreover, the joint member 82 is connected to a portion of the case 70 of the actuator 17.

When the head portion 81a of the first aiming screw 81 is rotated by a known jig (not shown), the screwed position between the shaft portion 81b and the joint member 82 is changed, and thus, the joint member 82 is moved in front and rear directions. Since the joint member 82 is connected to the case 70 of the actuator 17, the actuator 17 is also moved in the front and rear directions in response to the rotation of the first aiming screw 81.

FIGS. 4A to 4C are left side views for explaining the movement of each portion of the lamp unit 10 in response to the rotation of the first aiming screw 81. FIG. 4A shows an initial state. When the first aiming screw 81 is rotated left from the initial state, the actuator 17 is pushed forward. According to this, the lower portion of the lens holder 13 is pushed forward via the joint member 15. Accordingly, as shown in FIG. 4B, the lens holder 13 is rotated about a supporting shaft 13b, and the optical axis Ax of the projection lens 14 is inclined upward.

In contrast, when the first aiming screw 81 is rotated right, the actuator 17 is pulled rearward. According to this, the lower portion of the lens holder 13 is pulled rearward via the joint member 15. Accordingly, as shown in FIG. 4C, the lens holder 13 is rotated about the supporting shaft 13b, and the optical axis Ax of the projection lens 14 is inclined downward. That is, by operating the head portion 81a of the first aiming screw 81, a reference position of the actuator 17, that is, the reference position of the optical axis Ax of the projection lens 14 is adjusted in the vertical direction.

Figure 5C:
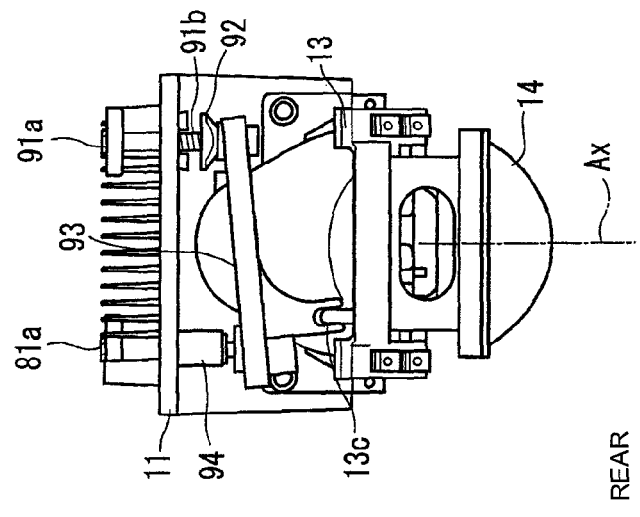
FIGS. 5A to 5C are plan views showing movement of the lamp unit of FIG. 1 in response to operation of a second aiming screw.
Figure 5A:
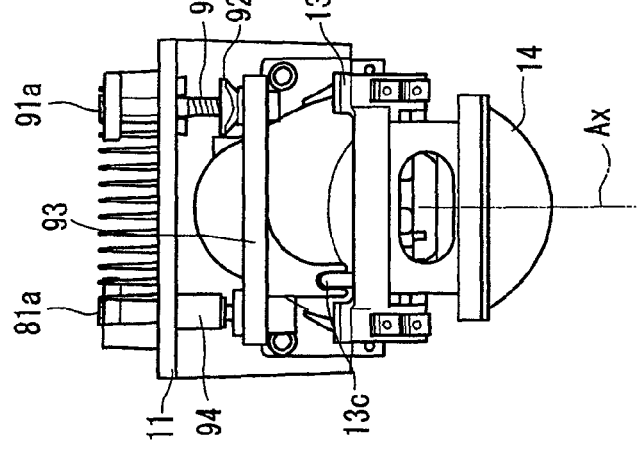
Figure 5B:
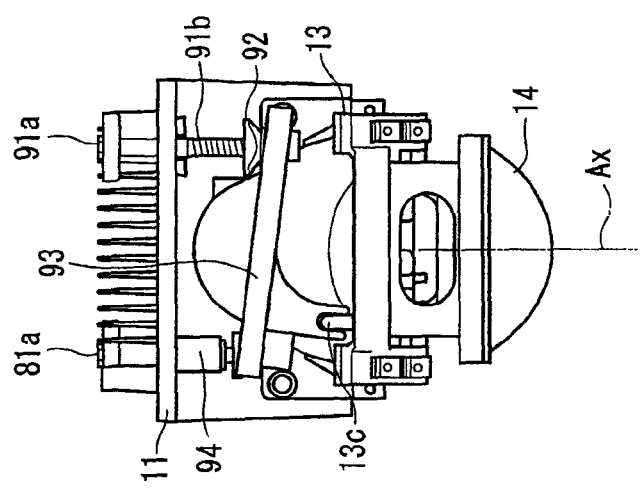

The second aiming mechanism 19 includes a second aiming screw 91 (an example of a screw), a joint member 92, a link member 93, and a supporting point member 94 (refer to FIGS. 5A to 5C). The second aiming screw 91 includes a head portion 91a and a shaft portion 91b.

As shown in FIG. 3, the head portion 91a is disposed on the rear surface side in the upper right portion of the rear plate 11a of the heat sink 11. As shown in FIGS. 4A to 4C, the shaft portion 91b penetrates the rear plate 11a of the heat sink 11 and extends forward. Screw grooves are formed on the outer circumferential surface of the shaft portion 91b. The joint member 92 includes a pair of clamping pieces in which screw grooves are respectively formed on opposing surfaces. By clamping the shaft portion 91b of the second aiming screw 91 in the vertical direction by the pair of clamping pieces, the screw grooves of the clamping pieces and the screw grooves of the shaft portion 91b are screwed.

As shown in FIGS. 5A to 5C, one end of the link member 93 is connected to the joint member 92, and the other end thereof is connected to the supporting point member 94. The supporting point member 94 is provided in the upper right side of the rear plate 11a of the heat sink 11.

FIGS. 5A to 5C are top views for explaining the movement of each portion of the lamp unit 10 according to the rotation of the second aiming screw 91. FIG. 5A shows an initial state. When the second aiming screw 91 is rotated left from the initial state, the one end of the link member 93 is pushed forward via the joint member 92. According to this, as shown in FIG. 5B, the link member 93 is rotated left about the connection portion between the link member and the supporting point member 94 and presses a joint protrusion 13c, which is formed in the lens holder 13, to the right side. According to this, the lens holder 13 is moved to the right side, and the optical axis Ax of the projection lens 14 moves in parallel to the right side.

In contrast, when the second aiming screw 91 is rotated right from the state shown in FIG. 5A, the one end of the link member 93 is pulled rearward via the joint member 92. According to this, as shown in FIG. 5C, the link member 93 is rotated right about the connection portion between the link member and the supporting point member 94 and presses the joint protrusion 13c to the left side. Accordingly, the lens holder 13 is moved to the left side, and the optical axis Ax of the projection lens 14 moves in parallel to the left side. That is, by operating the head portion 91a of the second aiming screw 91, the reference position of the optical axis Ax of the projection lens 14 is adjusted in the horizontal direction.

Figure 6A:
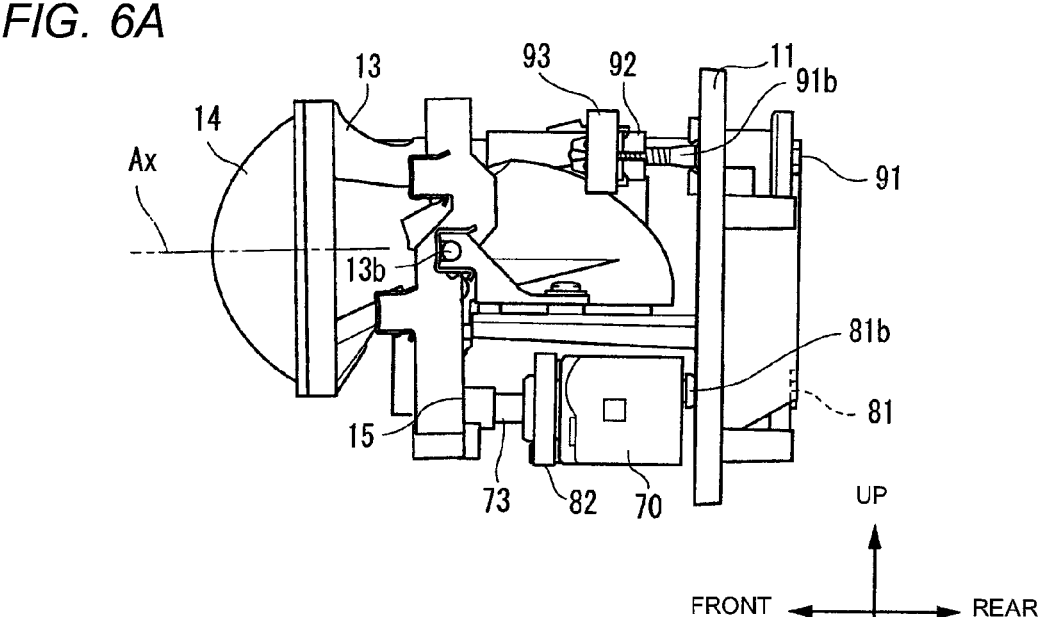
FIGS. 6A and 6B are left side views showing movement of the lamp unit of FIG. 1 in response to operation of an actuator.
Figure 6B:
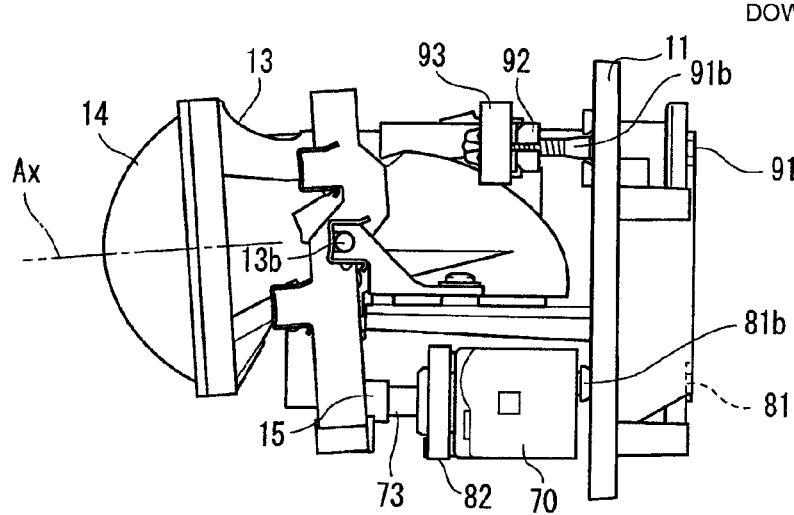

The actuator 17 is configured to change the direction of the optical axis Ax of the projection lens 14 in the vertical direction of the vehicle in response to a change of a vehicle height due to the number of passengers or loading of baggage. FIG. 6A shows a state where the optical axis Ax of the projection lens 14 is slightly inclined downward in response to the operation of the first aiming screw 81. FIG. 6B shows a state where the shaft 73 is pulled rearward from the state shown in FIG. 6A by operating the actuator 17.

By pulling the shaft 73, the lower portion of the lens holder 13 is pulled further rearward. The lens holder 13 is rotated about the supporting shaft 13b and is inclined further downward. Moreover, the optical axis Ax of the projection lens 14 which is supported to the lens holder 13 is also inclined further downward. That is, by further advancing and retreating the driving shaft of the actuator 17 based on the position of the optical axis Ax of the projection lens 14 which is adjusted by the operation of the aiming screw 91, the optical axis Ax can be moved in the vertical direction.

Accordingly, the actuator 17 serves as a control component for controlling the optical system which guides the light emitted from the light source 21 in a predetermined direction.

Next, a method of attaching the lamp unit 10 to the housing 2 will be described with reference to FIGS. 2, 3, and 7 to 9. As shown in FIG. 2, the lamp unit 10 according to the present embodiment is attached to the housing 2 from the inner side of the lamp chamber 3. A portion (an example of a first portion) of the rear plate 11a of the heat sink 11 is disposed to face the inner surface of a rear wall 2a (an example of a wall) of the housing 2.

In FIG. 3, only a portion of the rear wall 2a is shown. An opening 2c having an approximately rectangular shape is formed through the rear wall 2a. In the outer surface side of the rear wall 2a, four arms 2d extend rearward from a peripheral portion of the opening 2c. Four arms 2d are disposed near four corners of the approximately rectangular opening 2c. The tips of each arm 2d are bent, and fixation portions 2e are formed to extend in parallel to the rear wall 2a. An insertion hole 2f is formed in each fixation portion 2e. Each fixation portion 2e is provided to face the opening 2c.

Figure 7:
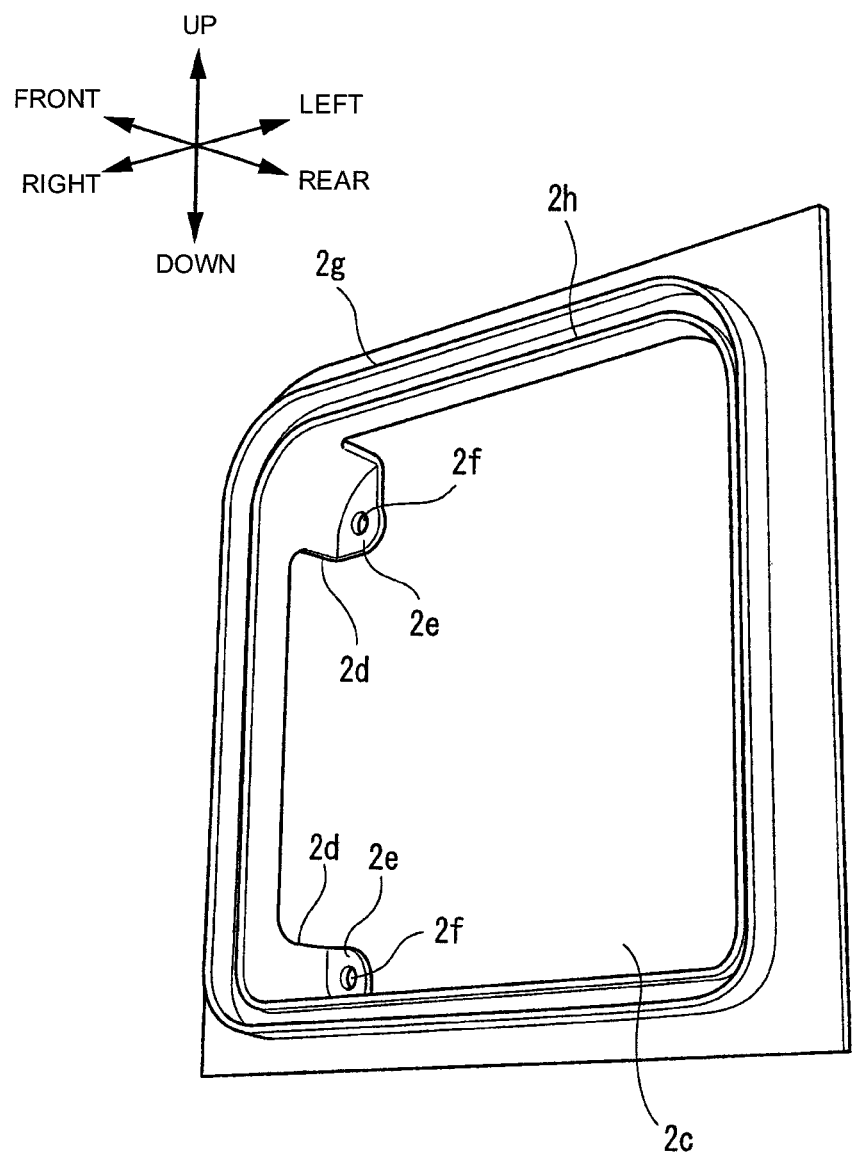
FIG. 7 is a perspective view showing a configuration of an inner surface of a rear wall of the housing of FIG. 1.

FIG. 7 shows an outline of a portion of the rear wall 2a when viewed from the inner surface side. An outer frame 2g and an inner frame 2h are formed on the inner surface of the rear wall 2a. The outer frame 2g is extended forward from the inner surface of the rear wall 2a to surround the opening 2c. The inner frame 2h is extended forward from the inner surface of the rear wall 2a in parallel to the outer frame 2g.

As shown in FIG. 3, an outer frame 11f and an inner frame 11g are formed on the rear surface of the rear plate 11a of the heat sink 11. The outer frame 11f is extended rearward from the rear surface of the rear plate 11a along the circumference of the rear plate 11a. The inner frame 11g is extended rearward from the rear surface of the rear plate 11a in parallel to the outer frame 11f. An annular groove 11h is formed between the outer frame 11f and the inner frame 11g.

Each of the radiation plates 11e, the head portion 81a of the first aiming screw 81, and the head portion 91a of the second aiming screw 91 described above is disposed inside the inner frame 11g. Moreover, four posts 11k extend rearward from the rear surface of the rear wall 11a on the inner side of the inner frame 11g. A screw hole 11m is formed in the top surface of each post 11k.

As shown in FIG. 3, a gasket 20 (an example of a sealing member) having elasticity is disposed between the rear plate 11a of the heat sink 11 and the rear wall 2a of the housing 2. The gasket 20 has approximately the same size and shape as the annular groove 11h which is formed on the rear surface of the rear plate 11a, and is fitted to the groove 11h.

Figure 8:
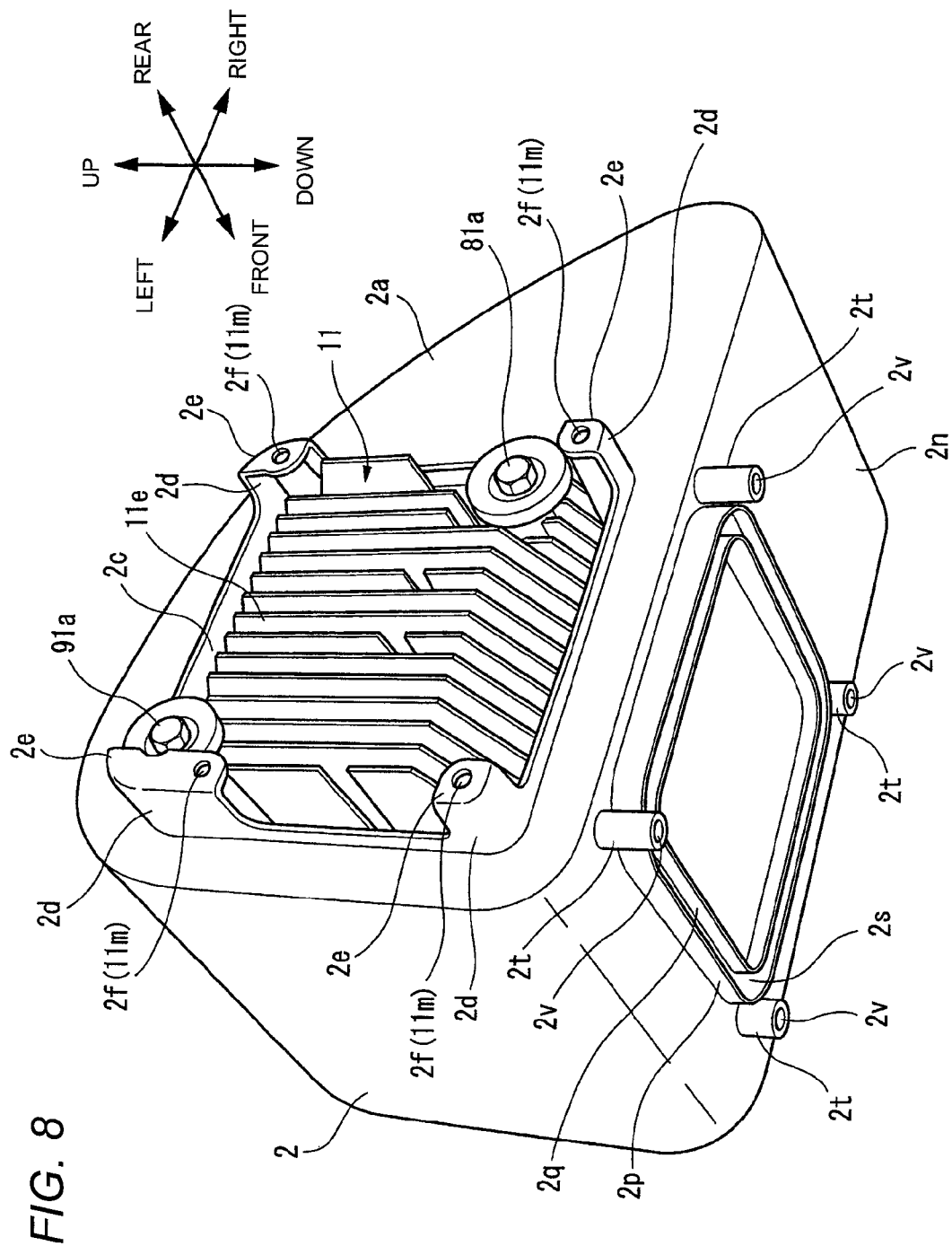
FIG. 8 is a perspective view showing an outline when the lighting device of FIG. 1 is viewed from the lower rear side.

By attaching the lamp unit 10 to the rear plate 2a of the housing 2 in this state, as shown in FIG. 8, a portion (an example of a second portion), in which the radiation plates 11e of the heat sink 11 are formed, is exposed to the outside of the rear wall 2a through the opening 2c of the housing 2.

Each post 11k of the heat sink 11 contacts the fixation portion 2e of the housing 2. Moreover, the screw hole 11m of each post 11k faces the insertion hole 2f which is formed on the corresponding fixation portion 2e. Screws (not shown) are inserted to screw holes 11m through the insertion holes 2f, so that the heat sink 11 is fixed to the housing 2. Thus, the lamp unit 10 is attached to the housing 2.

In the present embodiment, the lamp unit 10 is attached to the rear wall 2a of the housing 2 from the inside of the lamp chamber 3, and the fixation portions 2e which fix the heat sink 11 to the housing 2 are provided to face the opening 2c on the outside of the rear wall 2a. Accordingly, the rear wall 11a of the heat sink 11 can be attached when the size of the rear wall is slightly larger than that of the opening 2c. Accordingly, an increase in the size of the heat sink 11 can be avoided, and parts costs can be decreased.

Moreover, the size of the peripheral portion of the rear plate 11a which is positioned on the outside of the opening 2c can be minimized, and since the fixing parts such as screws are not exposed to the inside of the lamp chamber 3, it is not necessary to consider a shape of an extension which covers the fixing parts. Accordingly, a degree of freedom for selection of the shape of the extension can be improved.

Moreover, as described above, the first aiming screw 81 and the second aiming screw 91 extends to penetrate the portions which are exposed to the outside of the rear wall 2a through the opening 2c in the heat sink 11. Accordingly, the reference position of the optical axis Ax of the projection lens 14 can be adjusted without increasing the size of the structure.

Figure 9:
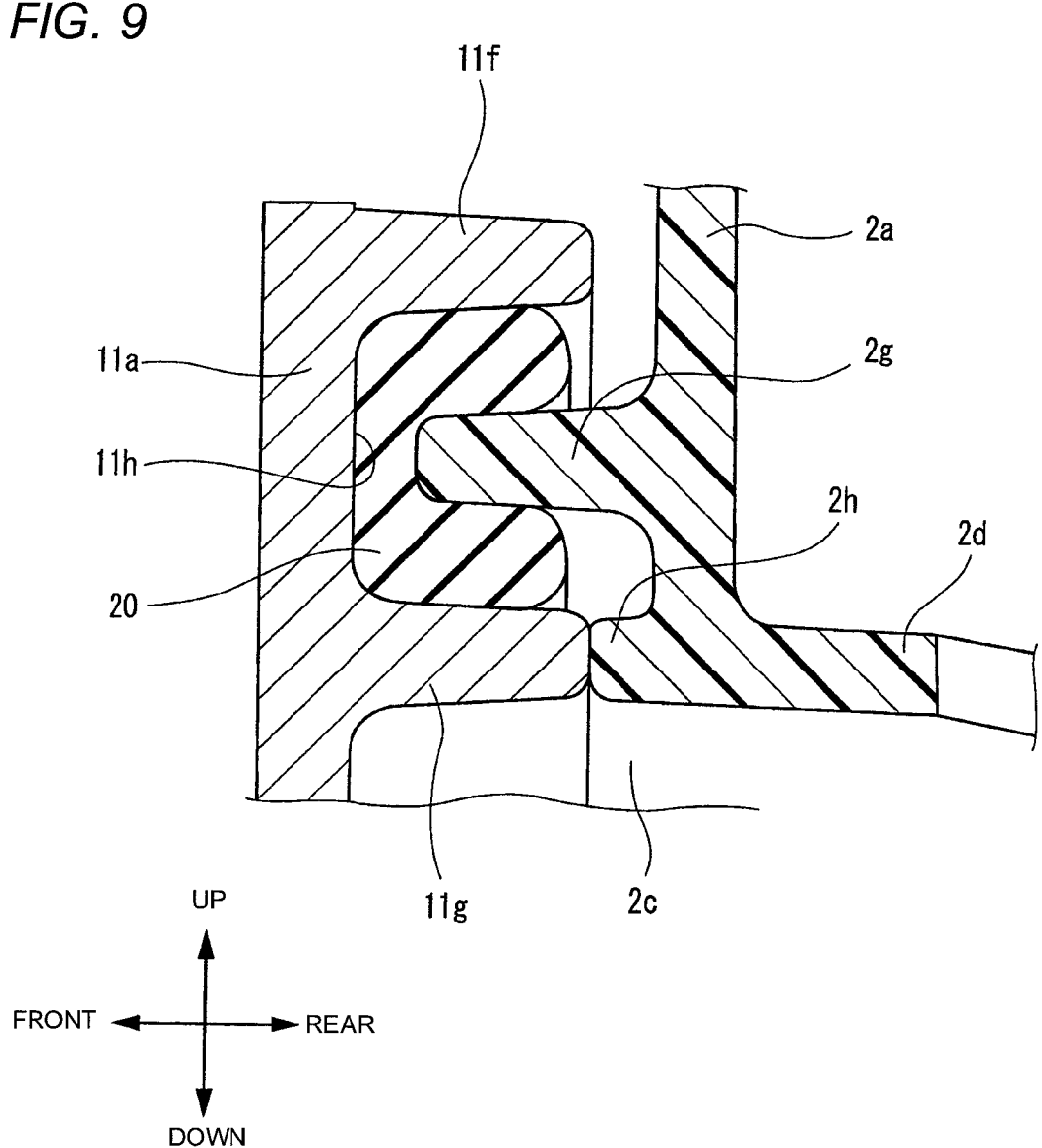
FIG. 9 is an enlarged cross-sectional view showing an attachment portion between the lamp unit and the housing of FIG. 1.

In FIG. 9, in the state where the lamp unit 10 is attached to the housing 2, the peripheral portion of the rear plate 11a of the heat sink 11 and a portion of the rear wall 2a of the housing 2 facing the peripheral portion are shown in an enlarged manner.

By pressing the rear plate 11a of the heat sink 11 against the inner surface of the rear wall 2a of the housing 2, the inner frame 2g (an example of a protrusion) formed on the inner surface of the rear wall 2a presses the gasket 20 which is provided in the groove 11h partitioned on the rear surface of the rear plate 11a. Accordingly, water or dust is prevented from entering the inner portion of the lamp chamber 3.

Moreover, the inner frame 11g formed on the rear surface of the rear plate 11a and the inner frame 2h formed on the inner surface of the rear wall 2a contact each other, so that the lamp unit 10 is positioned in the attachment direction. Moreover, since the contact position is positioned closer to the opening 2c of the rear wall 2a than to the gasket 20, it is possible to more securely prevent water or dust from entering the lamp chamber 3 through the opening 2c.

As shown in FIG. 8, a first frame 2p and a second frame 2q having approximately rectangular shapes are formed on a bottom wall 2n of the housing 2. The first frame 2p is formed such that a protrusion protruding downward from the bottom wall 2n extends to form a loop. The second frame 2q forms a loop such that a protrusion protruding downward from the bottom wall 2n extends along the outside of the first frame 2p in parallel to the first frame 2p. An annular groove 2s is formed between the first frame 2p and the second frame 2q. Four posts 2t in total are formed outside four corners of the second frame 2q. A screw hole 2v is formed in the top surface of each post 2t.

Figure 10A:
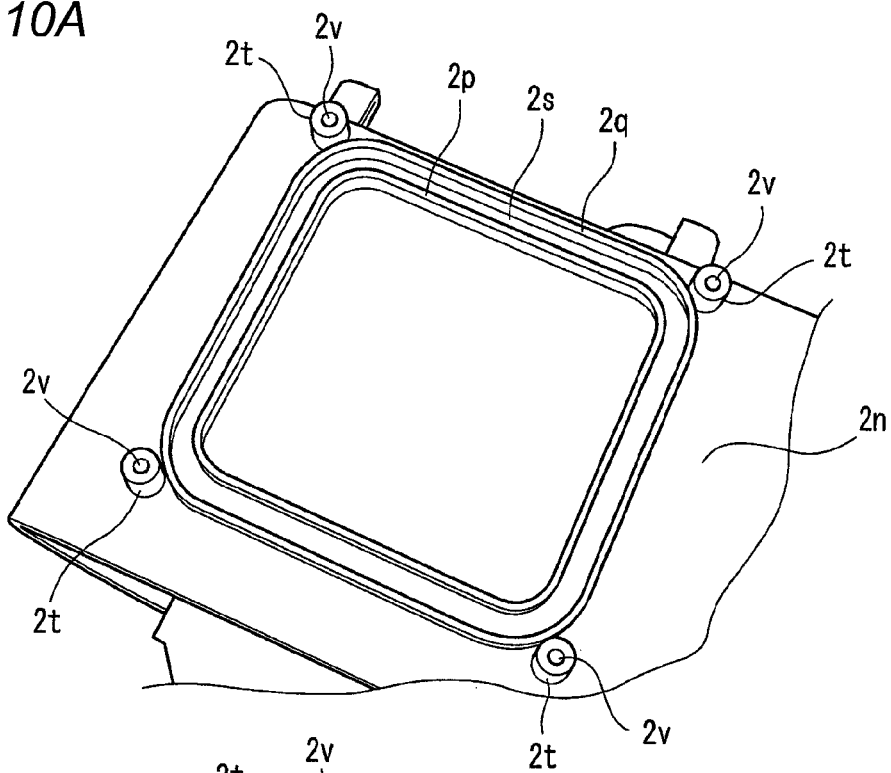
FIGS. 10A and 10B are enlarged views showing a work window which is formed in the housing of FIG. 1.
Figure 10B:
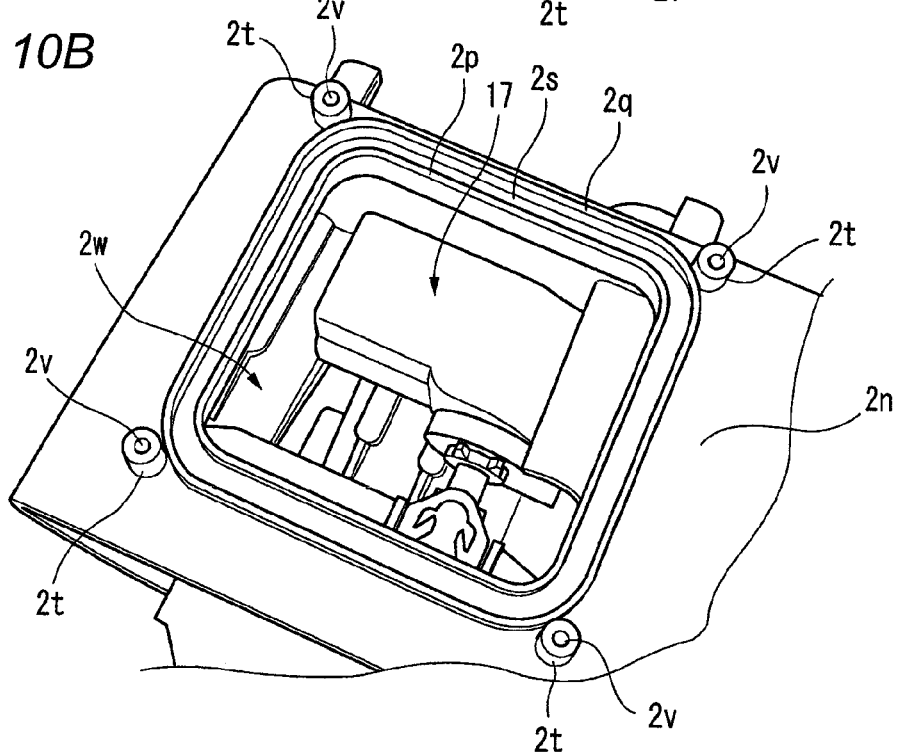

As shown in FIGS. 10A and 10B, in the bottom wall 2n of the housing 2, a work window 2w can be formed by cutting a portion of the bottom wall 2n along the first frame 2p by a jig (not shown). FIG. 10A shows a state before the cutting and FIG. 10B shows a state after the cutting. FIG. 11 is a view showing the lamp unit 10 which is disposed in the housing 2, wherein the lamp unit 10 is exposed through the work window 2w.

A position, a shape, and a size of the first frame 2p are determined so that the formed work window 2w faces the actuator 17. In the configuration in which the lamp unit 10 is attached to the housing 2 from the inner side of the lamp chamber 3, a maintenance work which easily replaces and repairs the actuator 17 through the work window 2w can be performed without requiring much labor such as the detachment of the translucent cover 4 from the housing 2.

Figure 12A:
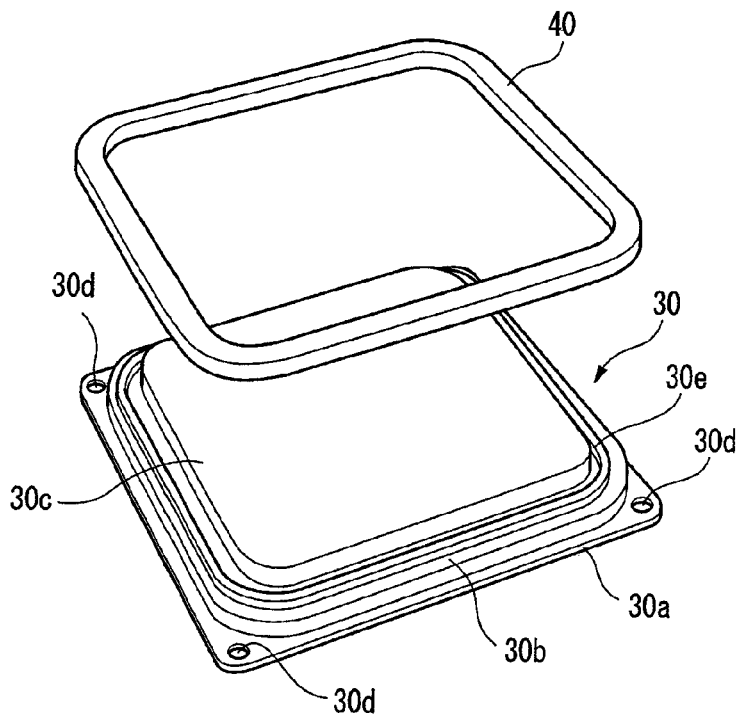
FIGS. 12A and 12B are views illustrating how the work window is closed by a cover body.

After the maintenance work is completed, the work window 2w is closed by a cover body 30 as shown in FIG. 12A. The cover body 30 includes a base portion 30a, a first convex portion 30b, and a second convex portion 30c. The base portion 30a has a rectangular shape, and four insertion holes 30d in total are formed in four corners. The first convex portion 30b protrudes from the base portion 30a in a region positioned inside the insertion hole 30d. The second convex portion 30c protrudes further than the convex portion 30b, and has approximately the same shape and size as the work window 2w. A protrusion 30e, which extends to surround the second convex portion 30c, is formed on the surface of the first convex portion 30b.

When the work window 2w is closed by the cover body 30, a gasket 40 is disposed between the cover body 30 and the bottom wall 2n. The gasket 40 has approximately the same shape and size as the annular groove 2s which is formed by the first frame 2p and the second frame 2q. Moreover, the shape and size of the first convex portion 30b, which surrounds the second convex portion 30c of the cover body 30, are approximately the same as those of the gasket 40.

Figure 12B:
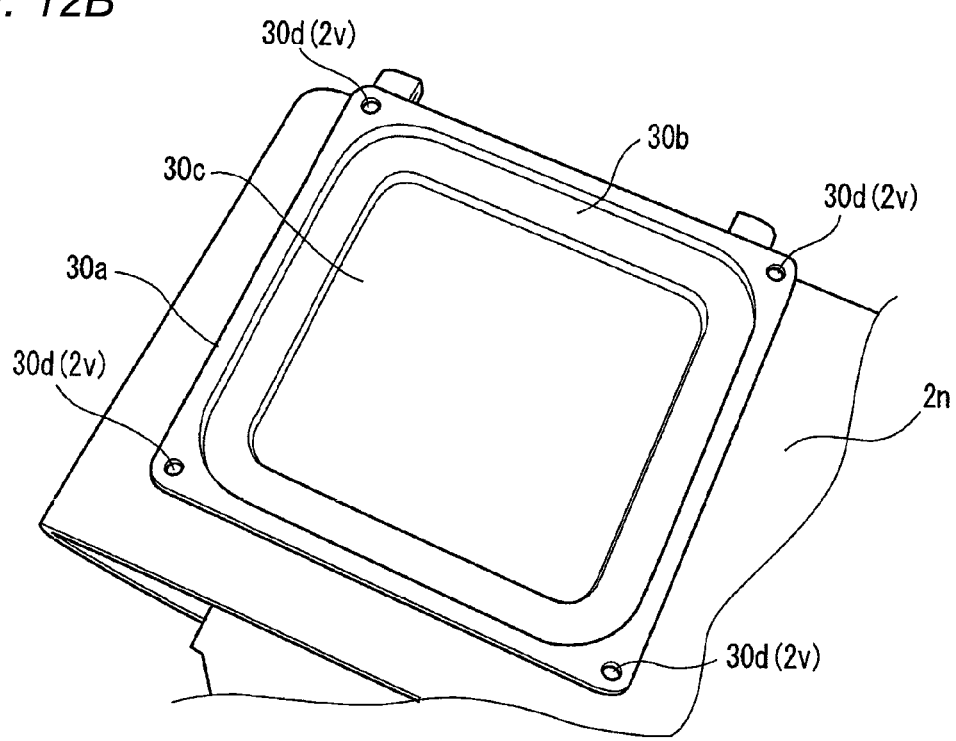

When the work window 2w is closed, first, the gasket 40 is provided in the groove 2s. Subsequently, as shown in FIG. 12B, the cover body 30 is placed on the bottom wall 2n. At this time, the second convex portion 30c is fitted to the inner circumference of the first frame 2p and closes the work window 2w. Moreover, each insertion hole 30d formed in the base portion 30a is disposed to face the screw hole 2v which is formed in each post 2t provided in the bottom wall 2n. In this state, screws (not shown) are inserted to respective screw holes 2v, so that the cover body 30 is fixed to the bottom wall 2n. At this time, the protrusion 30e formed in the first convex portion 30b presses the gasket 40, and thus a water-tight state is secured.

The replacement or the repair of the control component such as the actuator 17 is not necessarily needed during a product lifetime of the headlight device 1. Providing a configuration for maintenance (such as a door member which can be opened and closed when necessary) in advance for an opportunity which may not come surely causes an increase in the cost, and there is a concern that this cost may be wasteful.

However, in the present embodiment, by providing the first frame 2p which serves as a guide member for the position and shape of the work window 2w, the work window 2w can be easily and securely formed only when the work window is necessary. Accordingly, an increase in the manufacturing cost can be suppressed as much as possible. When the replacement and repair of the actuator 17 are not needed, the product lifetime of the headlight device 1 ends without forming the work window 2w.

Particularly, since the first frame 2p forms the loop, a window-shaped opening can be securely formed by only moving a jig along the first frame 2*p*, and maintenance workability is improved. Moreover, the first frame 2*p* has a shape which can mount the cover body 30 closing the work window 2*w* Accordingly, after the necessary work ends, the work window 2*w* is securely closed by the cover body 30, and thus, it is possible to prevent water or dust from entering into the lamp chamber 3.

In the above-described embodiment, the gasket 20 is provided in the groove 11*h* formed in the rear plate 11*a* of the heat sink 11, and the gasket 20 is pressed by the outer frame 2*g* (an example of a protrusion) which is formed in the rear wall 2*a* of the housing 2. However, the relationship between the groove and the protrusion may be reversed.

Figure 13:
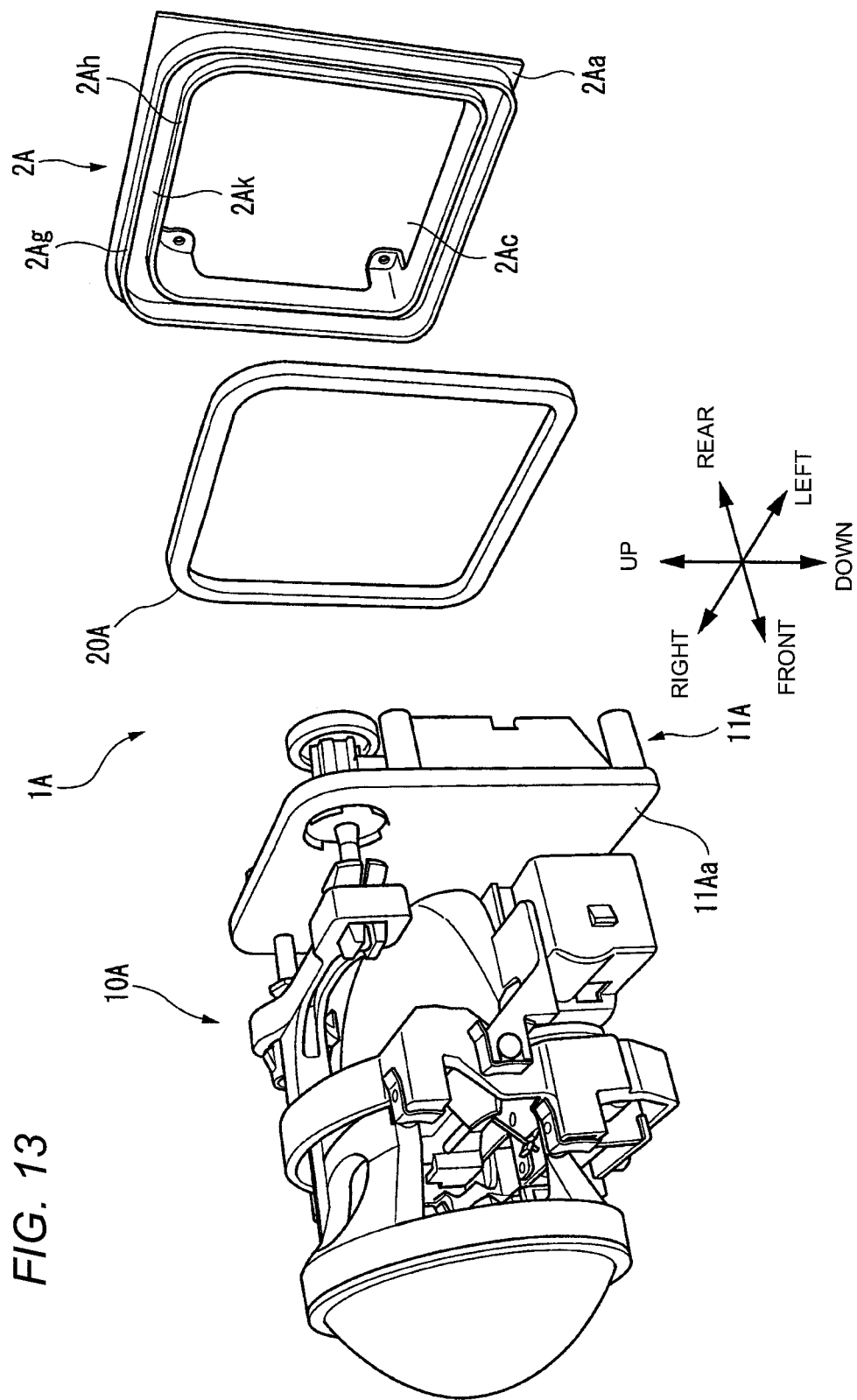
FIG. 13 is an exploded perspective view showing a method of attaching a lamp unit to a housing according to a second embodiment of the present invention.

FIG. 13 is an exploded perspective view showing a headlight device 1A according to a second embodiment of the present invention. The same reference numerals are attached to substantially the same configurations as the headlight device 1 according to the first embodiment, and the repeated descriptions are omitted herein.

In the present embodiment, an outer frame 2Ag and an inner frame 2Ah are formed on the inner surface of a rear wall 2Aa of a housing 2A. An annular groove 2Ak is formed between the outer frame 2Ag and the inner frame 2Ah. A gasket 20A has approximately the same size and shape as the groove 2Ak and is provided in the groove 2Ak.

Figure 14:
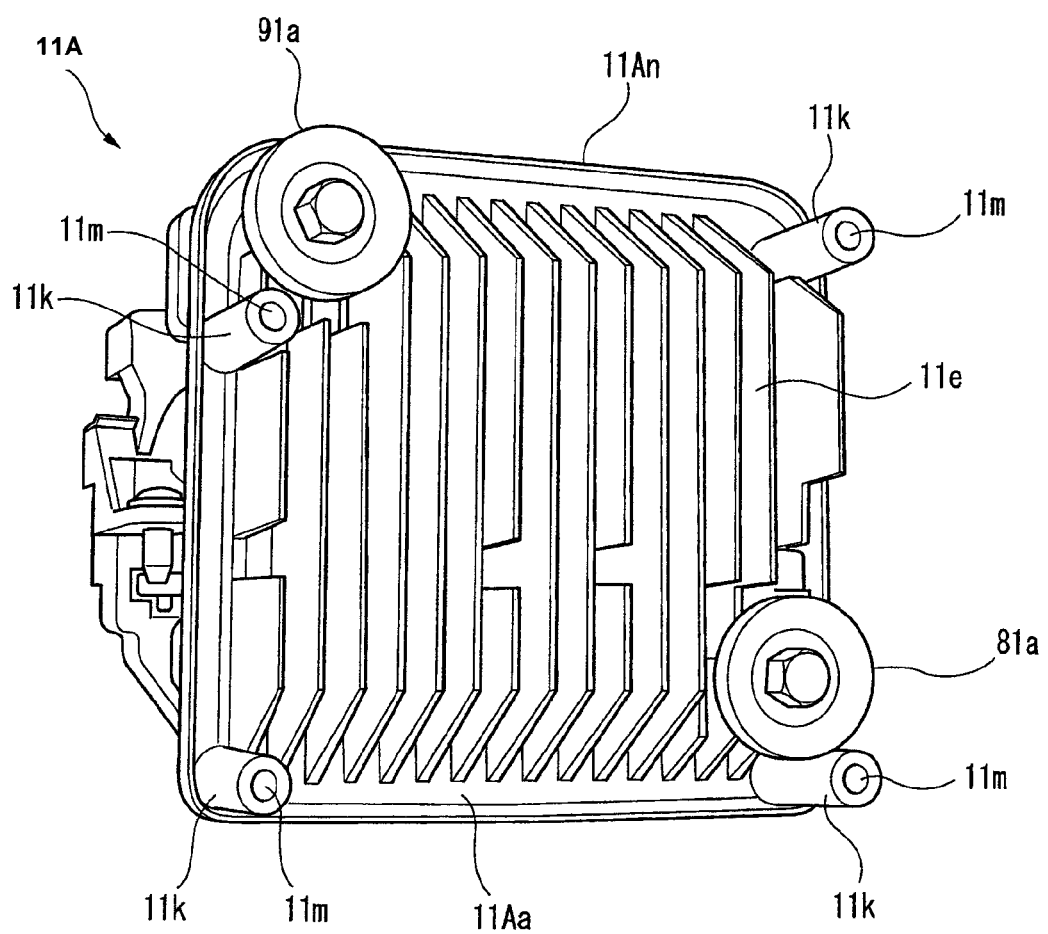
FIG. 14 is a perspective view showing an outline of the lamp unit of FIG. 13 when viewed from the rear side.

Meanwhile, as shown in FIG. 14, a circumferential wall 11An is formed on the rear surface of a rear plate 11Aa of a heat sink 11A. The circumferential wall 11An is formed such that a wall protruding rearward from the rear plate 11Aa extends along the circumference of the rear plate 11Aa. Each of the radiation plates 11*e*, the head portion 81*a* of the first aiming screw 81, and the head portion 91*a* of the second aiming screw 91 are disposed inside the circumferential wall 11An.

Figure 15:
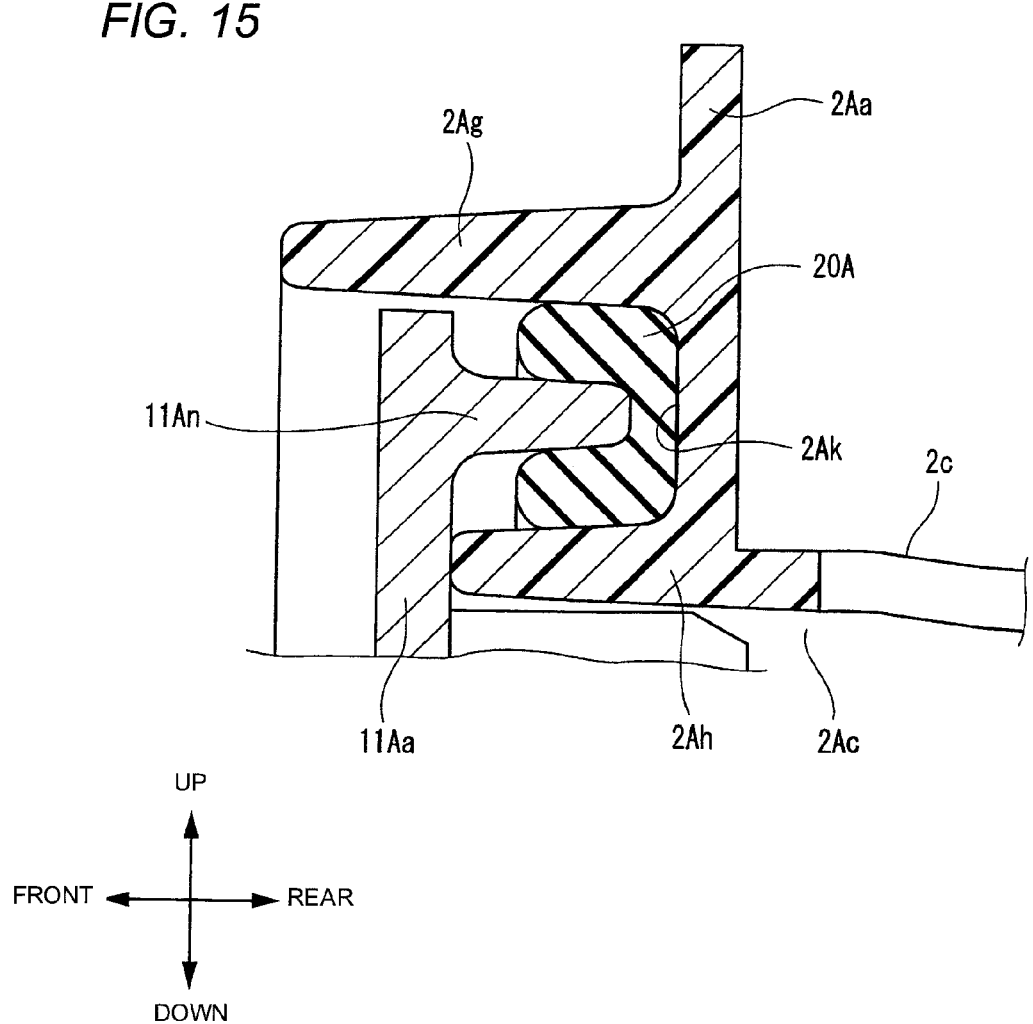
FIG. 15 is an enlarged cross-sectional view showing an attachment portion between the lamp unit and the housing of FIG. 13.

By pressing the rear plate 11Aa of the heat sink 11A against the inner surface of the rear wall 2Aa of the housing 2A, the lamp unit 10A is attached to the housing 2A. As shown in FIG. 15, the circumferential wall 11An (an example of a protrusion) formed on the rear surface of the rear plate 11Aa presses the gasket 20A which is provided in the groove 2Ak partitioned on the inner surface of the rear wall 2Aa. Accordingly, water or dust is prevented from entering the inner portion of the lamp chamber 3.

Moreover, the inner frame 2Ah formed on the inner surface of the rear wall 2Aa and the rear surface of the rear wall 11Aa contact each other, and thus, the lamp unit 10A is positioned in the attachment direction. In addition, since the contact position is positioned closer to the opening 2Ac of the rear wall 2Aa than to the gasket 20A, it is possible to more securely prevent water or dust from entering into the lamp chamber 3 through the opening 2Ac.

According to the present embodiment, the size of the peripheral portion of the rear plate 11Aa positioned outside the opening 2Ac can be further decreased. Specifically, as shown in FIG. 15, the outer shape of the rear plate 11Aa can be decreased to the extent that the rear plate 11Aa is accommodated in the inner side of the outer frame 2Ag formed on the inner surface of the rear wall 2Aa. Compared to the rear plate 11*a* according to the first embodiment, it can be understood that the outer shape of the rear plate 11Aa can be reduced by a portion which is positioned outside the inner frame 11*g*. Accordingly, parts costs can be suppressed according to the decrease in the size of the heat sink.

Moreover, the size of the peripheral portion of the rear plate 11Aa positioned outside the opening 2Ac can be minimized. Accordingly, it is not necessary to consider the shape of an extension which covers the portions. Accordingly, a degree of freedom for selection of the shape of the extension can be further improved.

In the headlight device 1 according to the first embodiment and the headlight device 1A according to the second embodiment, the gaskets 20 and 20A, which are examples of the sealing member, are pressed against the housings 2 and 2A in the attachment directions of the lamp units 10 and 10A. However, the pressing direction is not limited to the above-described example as long as the sealing member is interposed by the heat sink and the housing.

Figure 16:
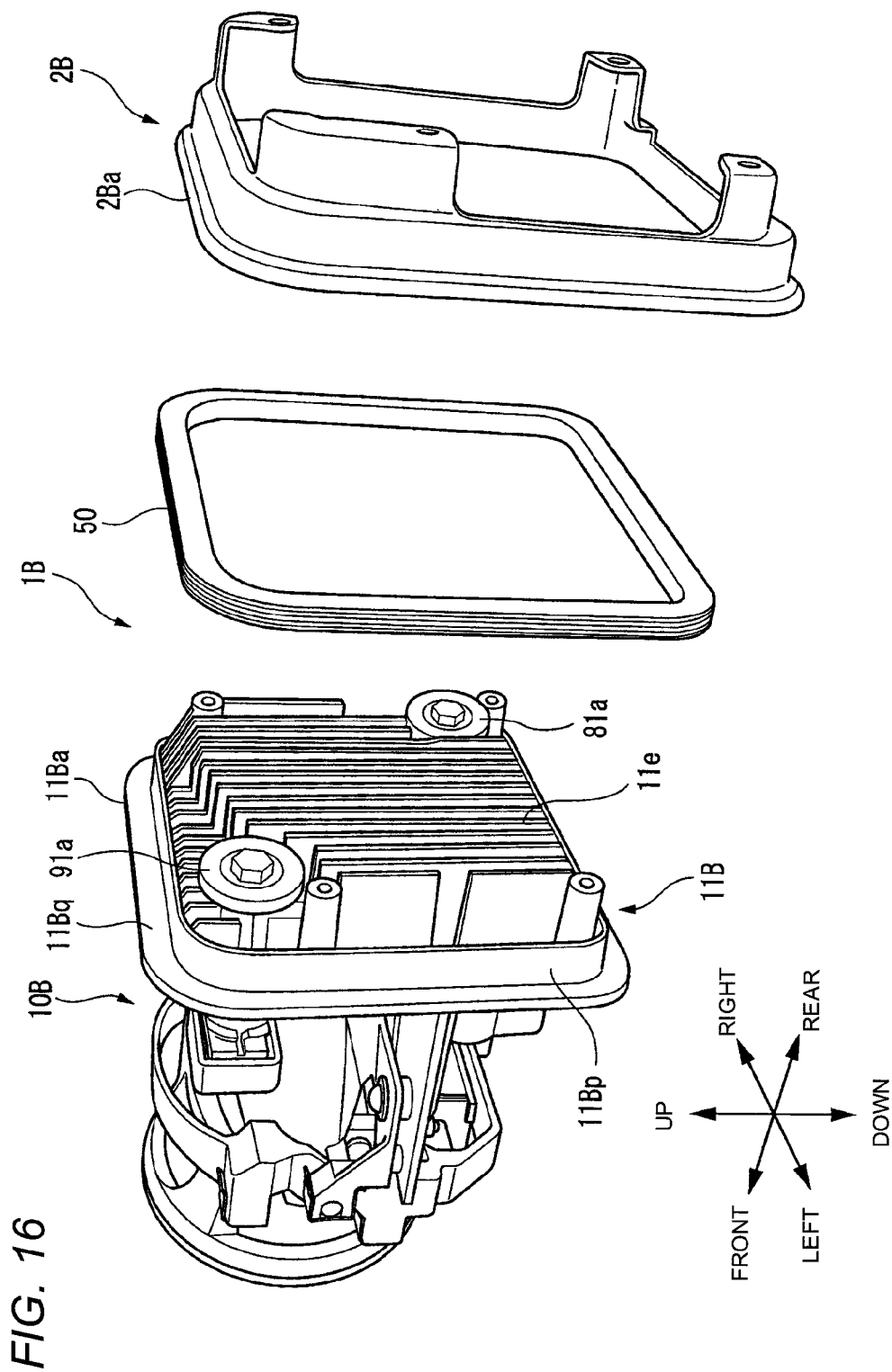
FIG. 16 is an exploded perspective view showing a method of attaching a lamp unit to a housing according to a third embodiment of the present invention.

FIG. 16 is an exploded perspective view showing a headlight device 1B according to a third embodiment of the present invention. The same reference numerals are attached to substantially the same configurations as the headlight device 1 according to the first embodiment, and the repeated descriptions are omitted herein.

In a heat sink 11B of the lamp unit 10B in the present embodiment, a single frame portion 11Bp protrudes rearward from the rear surface of a rear plate 11Ba. Each of the radiation plates 11*e*, the head portion 81*a* of the first aiming screw 81, and the head portion 91*a* of the second aiming screw 91 are disposed inside the frame portion 11Bp. The rear surface of the rear plate 11Ba forms a flange portion 11Bq on the outside of the frame portion 11Bp.

In the present embodiment, a packing 50 is used as a sealing member. The packing 50 is an annular member having elasticity, and the shape and size of the inner circumferential surface of the packing are approximately the same as those of the outer circumferential surface of the frame portion 11Bp.

Figure 17:
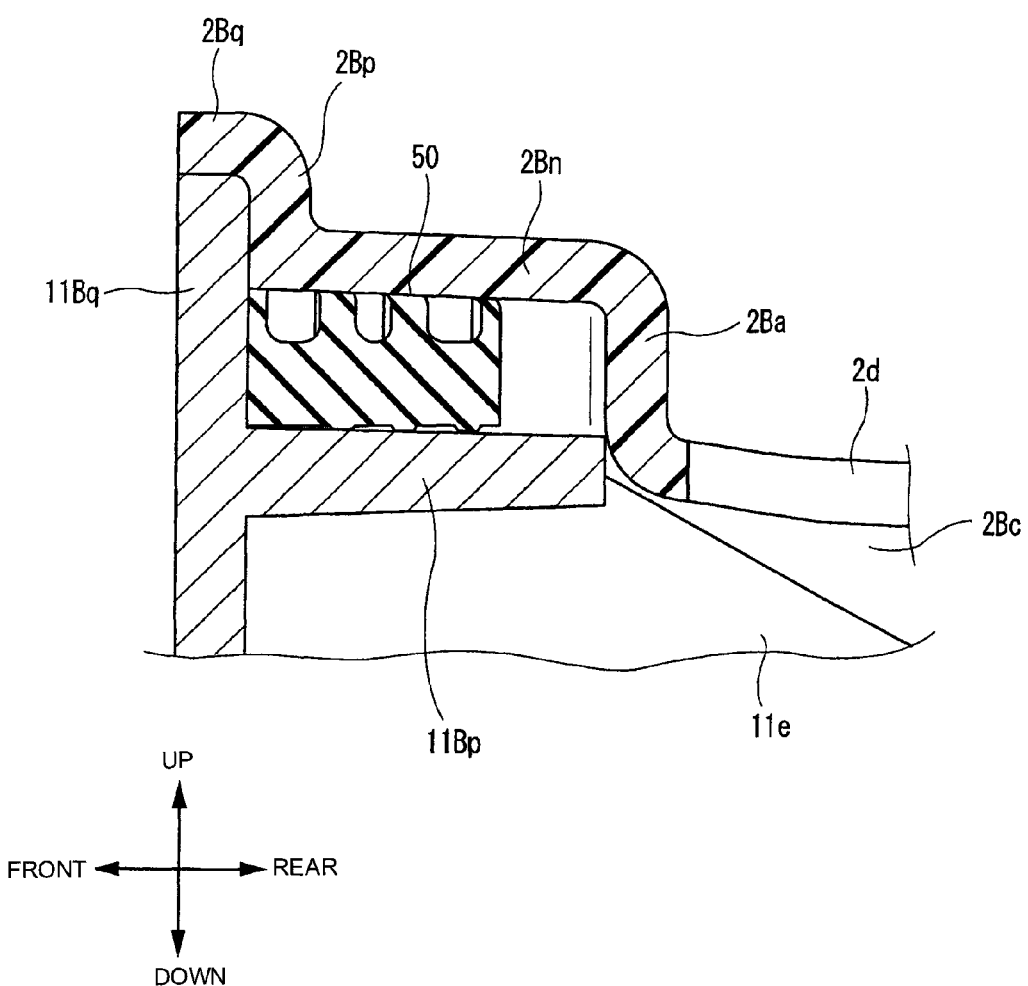
FIG. 17 is an enlarged cross-sectional view showing an attachment portion between the lamp unit and the housing of FIG. 16.

As shown in FIG. 17, the packing 50 is mounted on the heat sink 11B to surround the frame portion 11Bp. In this state, the lamp unit 11B is attached to a housing 2B from the inner side of the lamp chamber 3.

A circumferential wall 2Bn, which extends forward to surround the opening 2Bc, is formed on the inner surface of the rear wall 2Ba of the housing 2B. A first receiving portion 2Bp extending in parallel to the rear wall 2Ba is formed such that the front end of the circumferential wall 2Bn is bent outward. A second receiving portion 2Bq extending in parallel to the circumferential wall 2Bn is formed such that the outer end of the first receiving portion 2Bp is bent forward.

By pressing the rear plate 11Ba of the heat sink 11B against the rear wall 2Ba of the housing 2B, the rear surface of the flange portion 11Bq contacts the front surface of the first receiving portion 2Bp, and the outer circumference of the flange portion 11Bq contacts the inner surface of the second receiving portion 2Bq. The packing 50 is provided between the outer circumferential surface of the frame portion 11Bp of the heat sink 11B and the inner circumferential surface of the circumferential wall 11Bn of the housing 2B. Thus, a water-tight state is secured.

The rear end of the frame portion 11Bp contacts the inner surface of the rear wall 2Ba. Since the contact position is positioned closer to the opening 2Bc than to the packing 50, it is possible to more securely prevent water or dust from entering into the lamp chamber through the opening 2Bc.

According to the present embodiment, the size of the peripheral portion of the rear plate 11Ba positioned outside the opening 2Bc can be minimized. Accordingly, it is not necessary to consider the shape of an extension which covers the portions. Accordingly, a degree of freedom for selection of the shape of the extension can be further improved.

In order to easily understand the present invention, the above-described embodiments are suggested, but the present invention is not limited to the above described embodiments. The present invention can be modified within its concept.

In the above embodiment, an opening is provided for the maintenance work for the actuator 17, but the present invention is not limited to the embodiment shown in FIGS. 10A and 10B. The shape of the first frame 2p can be appropriately changed as long as a protrusion, which indicates the cutting position and guides the cutting jig, is provided.

When it is not necessary to cut a portion of the bottom wall 2n of the housing 2, the formation of the loop is not needed in the first frame 2p. For example, the first frame 2p may be formed in a U-shape. A cut is formed in a U-shape in the bottom wall 2n along the first frame 2p by a jig, and thus an opening is formed by pulling out the portion of the bottom wall 2n which is cut in U-shape.

Figure 18:
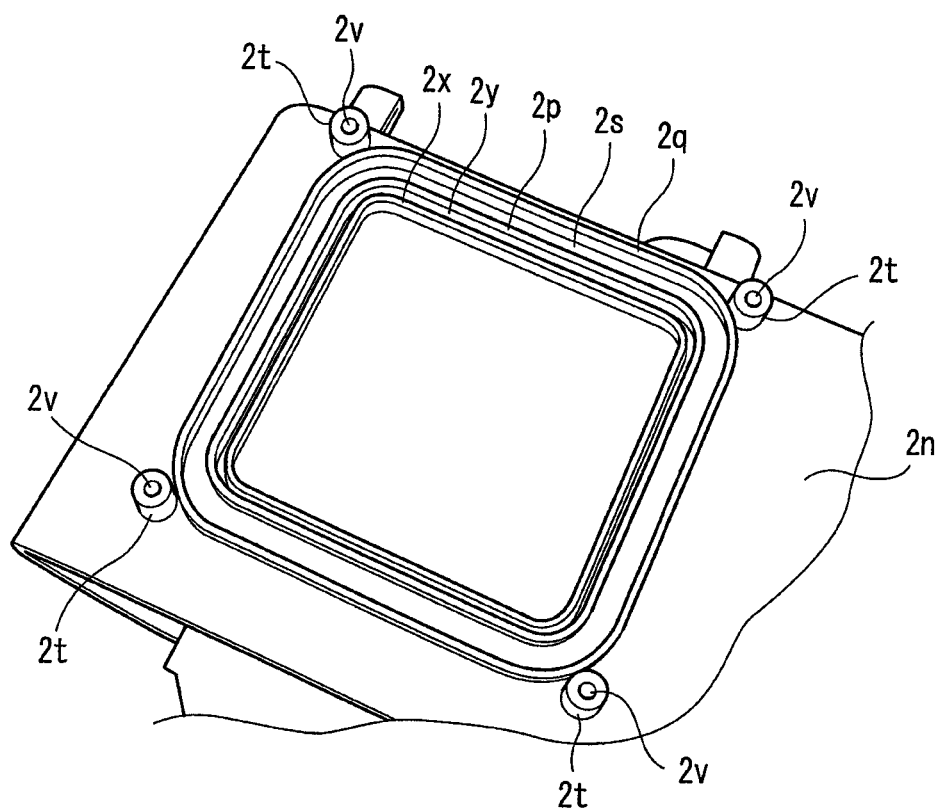
FIG. 18 is an enlarged view showing a modification example of a configuration of the work window.

Moreover, as shown in FIG. 18, a third frame 2x may be provided inside the first frame 2p. The third frame 2x forms a loop such that a protrusion protruding downward from the bottom wall 2n extends along the inside of the first frame 2p in parallel to the first frame 2p. An annular groove 2y is formed between the first frame 2p and the third frame 2x. The width of the groove 2y is narrower than that of the groove 2s formed between the first frame 2p and the second frame 2q, and is a width enough to guide a blade of the cutting jig.

According to this embodiment, since the movement of the cutting jig can be more suitably guided, workability of the formation of the work window 2w can be improved. The third frame 2x is cut along with a portion of the bottom wall 2n.

Moreover, if it is not necessary to close the work window 2w by the cover body 30, the second frame 2q and the posts 2t may be omitted.

The component subjected to the maintenance work through the work window 2w is not limited to the actuator 17. A component which is disposed in the lamp chamber 3 and controls the light source 21 or the optical system which guides the light emitted from the light source 21 in a predetermined direction may be subjected to the maintenance work through the work window 2w. A component which constitutes a portion of the optical system may be also subjected to the maintenance work.

Although it is not shown in the above-described embodiments, a controller including a calculation unit such as a CPU may be disposed in the lamp chamber 3. The controller is configured to control the operations of the light source 21, the actuator 17, the solenoid 34, or the like, and may be subjected to the maintenance work.

Accordingly, the position, in which the work window 2w is formed in the housing 2 (2A and 2B), is not limited to the position facing the actuator 17 in the bottom wall 2n. At least one protrusion may be provided in an appropriate position on the outer surface of the housing 2 (2A and 2B) except for the rear wall 2a (2Aa and 2Ba) such that the formed opening faces a portion of the optical system or the control component subjected to the maintenance work.

What is claimed is:

1. A lighting device configured to be mounted on a vehicle, the lighting device comprising:
    a housing forming a lamp chamber, the housing comprising a wall having an opening therethrough;
    a light source which is disposed in the lamp chamber;
    a heat sink, wherein the light source is fixed to the heat sink; and
    a fixation portion, the housing comprising the fixation portion,
    wherein
       the heat sink is fixed to the housing via the fixation portion,
       a first portion of the heat sink is provided inside the housing and faces an inner surface of the wall, the first portion being substantially parallel to the inner surface of the wall,
       a second portion of the heat sink is exposed to an outside of the wall through the opening,
       the fixation portion is provided on the outside of the wall to face the opening,
       the housing comprises an arm extending from the wall,
       the fixation portion extends from the arm, and
       the fixation portion extending substantially parallel to the inner surface of the wall.

2. The lighting device according to claim 1, further comprising: a sealing member which is pressed between the first portion of the heat sink and the inner surface of the wall.

3. The lighting device according to claim 2, wherein a groove for accommodating the sealing member is formed in one of the first portion of the heat sink or the inner surface of the wall, and wherein a protrusion for pressing the sealing member is formed in the other of the first portion of the heat sink or the inner surface of the wall.

4. The lighting device according to claim 2, wherein the first portion of the heat sink and the inner surface of the wall contact each other between the opening and the sealing member.

5. The lighting device according to claim 1, further comprising: an optical system configured to guide light emitted from the light source in a certain direction; and a screw configured to adjust a reference position of an optical axis of the optical system, wherein the screw extends to penetrate the second portion of the heat sink.

6. The lighting device according to claim 1, wherein the heat sink and the fixation portion are discrete structures.

7. The lighting device according to claim 1, wherein the first portion of the heat sink is provided on a first side of the wall in an optical axis direction adjacent the inner surface of the wall, and the second portion of the heat sink is provided on a second side of the wall in the optical axis direction adjacent an outer surface of the wall.

8. The lighting device according to claim 1, wherein the heat sink comprises a post configured to contact the fixation portion, and the post of the heat sink is fixed to the housing via the fixation portion.

9. The lighting device according to claim 8, wherein the post of the heat sink comprises a hole, and the post of the heat sink is configured to be fixed to the fixation portion of the housing with a fastener.

10. A lighting device configured to be mounted on a vehicle, the lighting device comprising:
    a housing forming a lamp chamber, the housing comprising a wall having an opening therethrough;
    a light source which is disposed in the lamp chamber;
    a heat sink, wherein the light source is fixed to the heat sink;
    a fixation portion, wherein the heat sink is fixed to the housing via the fixation portion, wherein a first portion of the heat sink faces an inner surface of the wall, wherein a second portion of the heat sink is exposed to an outside of the wall through the opening, and wherein the fixation portion is provided on the outside of the wall to face the opening;

an optical system configured to guide light emitted from the light source in a certain direction; and a screw configured to adjust a reference position of an optical axis of the optical system, wherein the screw extends to penetrate the second portion of the heat sink, and wherein the optical axis of the optical system is adjusted with respect to the light source.

* * * * *